Dec. 29, 1953     W. R. RUMBAUGH     2,663,944
PISTON ROD STUFFING-BOX GAUGE
Filed July 28, 1950
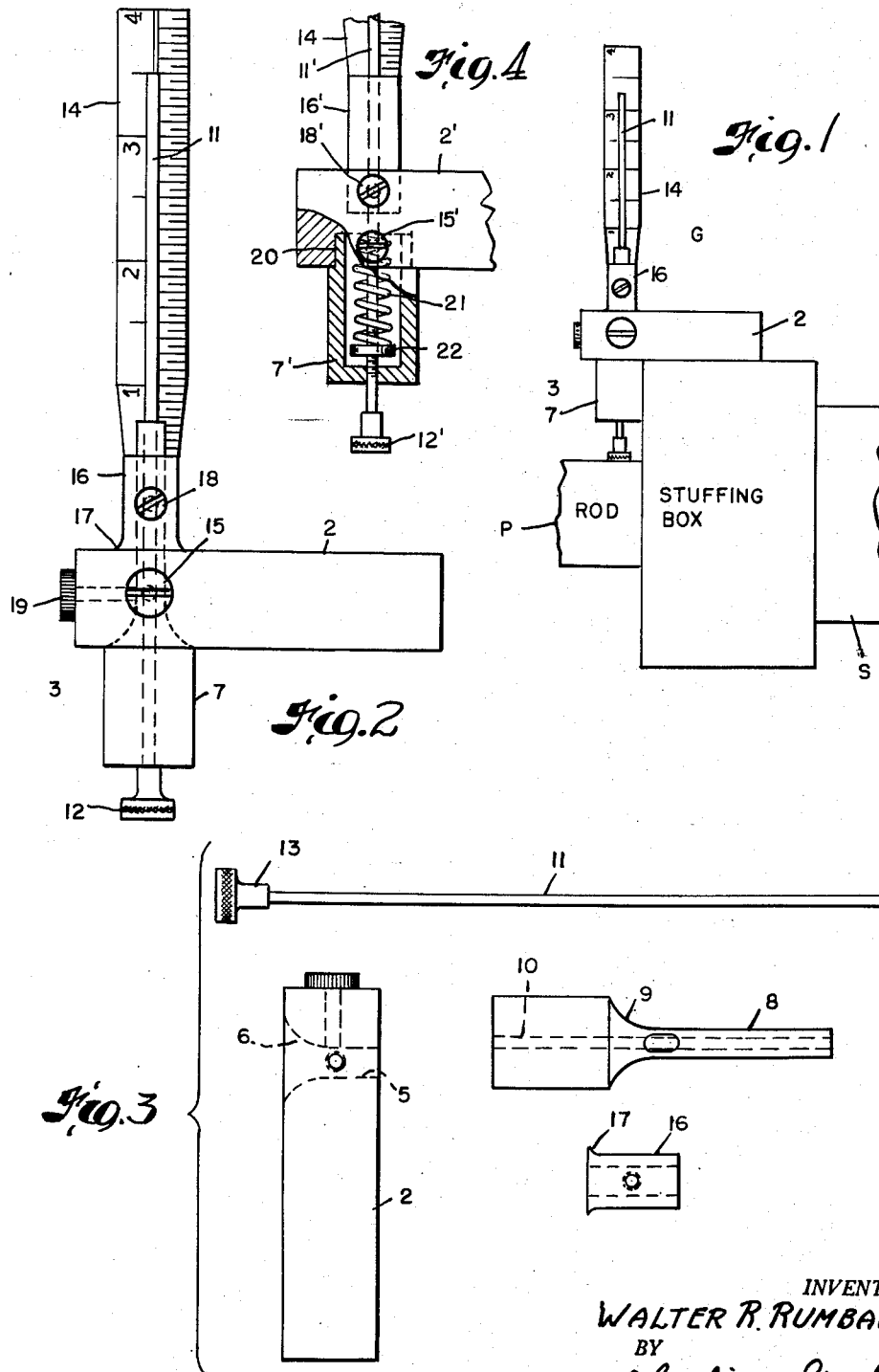

Patented Dec. 29, 1953

2,663,944

UNITED STATES PATENT OFFICE 2,663,944

PISTON ROD STUFFING-BOX GAUGE

Walter R. Rumbaugh, Lima, Ohio, assignor to The Standard Oil Company, Cleveland, Ohio, a corporation of Ohio Application July 28, 1950, Serial No. 176,501

5 Claims. (Cl. 33—169)

1

In devices having piston rods or plungers operating through packing in stuffing boxes, such as in pumps and the like, misalignment may sometimes develop as between the rod and stuffing box, causing uneven wear and leakage. How to detect such condition in early stages and accurately and simply, has been a long time problem, and usually the condition becomes serious before it is recognized. By the present invention such conditions may be accurately and quickly discovered, so as to be remedied without undue delay. Other objects and advantages of the invention will appear from the following description.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a fragmentary side elevational view of an embodiment of the invention in association with a stuffing box of a steam pump;

Fig. 2 is a larger scale side elevational view of the gauge;

Fig. 3 is an exploded view of the gauge; and

Fig. 4 is a side elevational view, partly in section, showing modified structure.

With a piston rod P, Fig. 1, reciprocatingly traveling in a stuffing box S, the gauge of the present invention G may be held against the stuffing box so that the one end of the pointer of the gauge can rest on the traveling piston rod. Variations as between the rod and the stuffing box are then made visible by movement of the pointer as influenced by the piston rod sliding back and forth under it. With the finding of a deviation, steps can then be taken to correct the difficulty. The gauge in its general aspect somewhat suggests a square, with base bar 2 to rest against the stuffing box, and the outer-guide 3 at right angles to the base bar. The base bar 2, Fig. 3, has a bore 5 near one end, such bore being in part tapered as at 6, and in part cylindrical. To this bore is fitted a leg 7 having an extended stem 8 which in general is cylindrical corresponding to the said bore, and also has a corresponding tapered portion 9. Through the leg and stem is a bore 10. With the stem 8 of the leg then seated in the bore 5 of the base bar, as in Fig. 2, the pointer 11 can extend through the bore 10 and have its one end 12 enlarged and having a shoulder 13 for limitedly abutting the leg. The free end of the head 12 is smooth to ride on the piston rod. The other end of the pointer extends alongside a graduated scale 14. Thereby, variations of the pointer with respect to the base bar and stuffing box, with different positions of the piston rod, are primarily visible on the graduated scale. The leg 7 and its stem 8 may be held in assembly with the base bar 2 by a press fit or by a set screw 15 which is tapped into the base bar against the stem 8. The graduated scale 14 is carried by a collar 16, which may have a flanged or flaring base 17 and seats over the stem 8 and against the base bar 2. The scale with its supporting collar can be turned into desired position about the stem 8 as center of rotation, and may be locked in position by a set screw 18. A lock screw 19 tapped into the end of the base bar 2 can extend through an opening in the side of the stem 8 and against the spindle therewithin, when turned up tight, to bind and hold the spindle against falling out when the device is not in operation and is to be carried about. For use against a piston rod, the set screw 19 is of course loosened so as to allow free sliding movement of the outer spindle.

In Fig. 4, the relationship of the base bar 2' and the leg 7' and the pointer 11' on the graduated scale 14 is the same as foregoing. The leg 7' has a reduced end 20 which fits into a shallow bore in the base bar 2', and is held by a set screw 15' through the adjacent wall of the base bar and engaging the reduced portion 20. The leg 7' has a central bore large enough to accommodate a coil spring 21 about the pointer or spindle 11' and bearing at one end against the base bar 2' and at the other end against an adjustable nut 22 which is screw threaded on the indicator pointer 11'. By suitable adjustment of the nut 22, the pointer indicator 11' can be given a sufficient bias, which need not be much, to enable it to ride by head 12' on the piston rod and provide an indication on the graduated scale, irrespective of gravity. The collar 16' which carries the graduated scale 14 is set into a shallow bore in the base bar 2' and held by set screw 18'.

The manner of operation of the device is clearly understood from the foregoing, and by its use, deviations may be quickly and accurately determined, so as to permit necessary corrective measures before damage occurs.

Other modes of applying the principle of the invention may be employed, change being made as regards the details described, provided the features stated in any of the following claims, or the equivalent of such, be employed.

I therefore particularly point out and distinctly claim as my invention:

1. A piston rod stuffing-box gauge, of generally L-shape comprising a base bar to rest against a stuffing-box, a transverse bore tapered in part through said bar near one end, a leg correspondingly tapered in part and having a reduced-diameter stem to seat in said bore, a set screw threaded in said bar for locking said stem in the base bar, a collar on such reduced-diameter stem and seating against the base bar, a set screw threaded in the collar for locking said collar to the stem, a graduated scale carried by said collar, a bore through said leg and stem, a pointer slidable in such bore having one end enlarged to rest against the piston rod adjacent the stuffing-box and the other end visible alongside said scale, and a lock screw in said bar for removably locking said pointer in its guide bore.

2. A piston rod stuffing-box gauge, of generally L-shape comprising a base bar to rest against a stuffing-box, a transverse bore tapered in part through said bar near one end, a leg correspondingly tapered in part and having a reduced-diameter stem to seat in said bore, a set screw threaded in said bar for locking said stem in the base bar, a collar on such reduced-diameter stem and seating against the base bar, a set screw threaded in the collar for locking said collar to the stem, a graduated scale carried by said collar, and a pointer slidable in such bore having one end enlarged to rest against the piston rod adjacent the stuffing-box and the other end being visible alongside said scale.

3. A piston rod stuffing-box gauge, comprising means providing an angle fitting against the periphery and against the end of a stuffing-box, including a base bar to rest against the stuffing-box periphery, a transverse bore through said bar near one end, a leg oriented at a right angle to said bar to fit against the stuffing-box end and being secured to said bar and having a bore co-axial with said longitudinal bore in the base bar, a hollow collar also coaxial with said bore, a graduated scale carried by said collar, and a pointer slidable in the leg and base bar and collar and having one end to rest against the piston rod and the other end being visible on the graduated scale.

4. A piston rod stuffing-box gauge, of generally L-shape comprising an elongated base bar to rest against a stuffing-box, a transverse bore through said bar near one end, a leg having a reduced-diameter portion seated in the transverse bore of said base bar as an assembly guide assembling the leg to the base bar in fixed position, a set screw in said bar locking the said leg, a pointer slidable in said leg and base bar and having one end to rest against a piston rod and the other end being visible, and means for eliminating undesired gravitational action on said pointer including a nut threaded on the pointer and a spring between said nut and said base bar.

5. A piston rod stuffing-box gauge, of generally L-shape comprising an elongated base bar to rest against a stuffing-box, a transverse bore through said bar near one end, a leg having a reduced-diameter stem in the base bar, a collar on such reduced-diameter stem and seating against the base bar, a set screw threaded in the collar for locking said collar to the stem, and a pointer slidable in such bore having one end to rest against the piston rod adjacent the stuffing box, and the other end being visible beyond the bore.

WALTER R. RUMBAUGH.

References Cited in the file of this patent

UNITED STATES PATENTS

| Number | Name | Date |
|---|---|---|
| 750,449 | Gillard | Jan. 26, 1904 |
| 1,463,095 | Rudnay | July 24, 1923 |
| 1,553,387 | McDermott | Sept. 15, 1925 |
| 1,638,887 | Sirokman | Aug. 16, 1927 |
| 2,401,085 | La Valley | May 28, 1946 |